United States Patent
Wang et al.

(10) Patent No.: US 7,664,351 B2
(45) Date of Patent: Feb. 16, 2010

(54) METHOD OF MANUFACTURING $CO_2$ LASER GROOVED LONG PERIOD FIBER GRATINGS

(75) Inventors: Dongning Wang, Kowloon (HK); Yiping Wang, Kowloon (HK); Wei Jin, Kowloon (HK)

(73) Assignee: Hong Kong Polytechnic University, Kowloon, Hong Kong SAR (CN)

( * ) Notice: Subject to any disclaimer, the term of this patent is extended or adjusted under 35 U.S.C. 154(b) by 0 days.

(21) Appl. No.: 11/715,419

(22) Filed: Mar. 8, 2007

(65) Prior Publication Data
US 2008/0025669 A1    Jan. 31, 2008

Related U.S. Application Data

(60) Provisional application No. 60/834,160, filed on Jul. 31, 2006.

(51) Int. Cl.
G02B 6/34 (2006.01)
G02B 6/26 (2006.01)
G02F 1/035 (2006.01)

(52) U.S. Cl. ............... 385/37; 385/2; 385/39
(58) Field of Classification Search ........... 385/37, 385/2, 39
See application file for complete search history.

(56) References Cited

U.S. PATENT DOCUMENTS

| | | | |
|---|---|---|---|
| 5,757,540 A | 5/1998 | Judkins et al. | |
| 6,269,207 B1 | 7/2001 | Carberry et al. | |
| 6,275,631 B1 | 8/2001 | Jang | |
| 6,301,410 B1 | 10/2001 | Carberry et al. | |
| 6,404,956 B1* | 6/2002 | Brennan et al. | 385/37 |
| 6,563,984 B1 | 5/2003 | Harumoto et al. | |
| 6,597,449 B1* | 7/2003 | Smolka et al. | 356/300 |
| 6,647,181 B2 | 11/2003 | Jang | |
| 6,795,599 B2* | 9/2004 | Spirin et al. | 385/12 |
| 7,013,066 B1 | 3/2006 | Wu et al. | |
| 2002/0176647 A1* | 11/2002 | Spirin et al. | 385/12 |
| 2003/0012500 A1* | 1/2003 | Oliveti | 385/37 |
| 2003/0108323 A1* | 6/2003 | Hashimoto | 385/137 |
| 2007/0060847 A1* | 3/2007 | Leo et al. | 600/587 |
| 2007/0107502 A1* | 5/2007 | Degertekin | 73/105 |

OTHER PUBLICATIONS

Novel Fiber-Optic Sensors Based on Long-Period Fiber Gratings Written by High-Frequency CO2 Laser Pulses, May 2003, Journal of Lightwave Technology, vol. 21, No. 5.*
Rao et al., Novel Fiber-Optic Sensors Based on Long-Period Fiber Gratings Written by High-Frequency $CO_2$ Laser Pulses, May 2003, Journal of Lightwave Technology, vol. 21, No. 5.
Davis et al., Long-period fibre grating fabrication with focused $CO_2$ laser pulses, Electronics Letters, Feb. 5, 1998, vol. 34, No. 3.

* cited by examiner

*Primary Examiner*—K. Cyrus Kianni
(74) *Attorney, Agent, or Firm*—Kauth, Pomeroy, Peck & Bailey LLP (57) ABSTRACT

In the present invention, methods and systems for fabricating novel LPFGs are taught. Fabrication is preformed by focusing a $CO_2$ laser beam having a diameter of 30 to 40 μm onto a fiber, such fiber being fixed and weighted on either ends. The variations of transmission spectrum and polarization dependent (PDL) loss of the $CO_2$ laser-grooved LPFGs with different fabrication parameters as functions of applied as functions of applied tensile stain are demonstrated and evaluated.

9 Claims, 8 Drawing Sheets

METHOD OF MANUFACTURING CO$_2$ LASER GROOVED LONG PERIOD FIBER GRATINGS

BACKGROUND

Long period fiber grating (LPFG) is a promising passive optical fiber device. Since the first LPFG was produced by Ultraviolet (UV) laser exposure in 1996, LPFGs have been undergoing rapid development. A promising LPFG fabrication employing a CO$_2$-laser was recently proposed due to the simple process and low cost. Davis et al. (Davis et al., "Long-period fiber grating fabrication with focused CO$_2$ laser pulses") reported a LPFG fabrication method based on CO$_2$-laser-induced residual stress relaxation. Rao et al. (Rao et al., "Novel fiber-optic sensors based on long-period fiber grating written by high frequency CO$_2$ laser pulses") demonstrated a writing technique based on the thermal shock effect of focused high-frequency CO$_2$ laser pulses. There are no physical deformations in the LPFGs fabricated by Davis and Rao. Single side incidence of the CO$_2$ laser beam induces an asymmetric index profile within the cross section of the LPFG. It has been demonstrated by authors that these LPFGs have unique strain-, bend-, torsion-, and load-characteristics due to an asymmetric index profile within the cross section. Recently a novel LPFG fabrication technique based on carving periodic grooves on the fiber by use of a focused CO$_2$ laser beam was proposed by the authors. Such a technique can fabricate high quality LPFGs with a large transmission attenuation of up to −47.39 dB and a low insertion loss of down to 0.34 dB.

It is an object of the present system to overcome the disadvantages and problems in the prior art.

DESCRIPTION

The present system proposes a CO$_2$ laser-grooved LPFG combining the features of the CO$_2$ laser-induced LPFG without physical deformation, the corrugated LPFGs fabricated by hydrofluoric acid etching, and the microbend-induced LPFGs. It is expected that this type of LPFG would have novel characteristics and may find some applications in sensing and communications.

The present invention also proposes methods of manufacturing fiber optics with long period grating, utilizing a CO$_2$ laser beam, and fixing and weighting the ends of fiber optic during manufacture.

These and other features, aspects, and advantages of the apparatus and methods of the present invention will become better understood from the following description, appended claims, and accompanying drawings where:

The following description of certain exemplary embodiment(s) is merely exemplary in nature and is in no way intended to limit the invention, its application, or uses.

Now, to FIGS. 1-8,

In the present invention, we fabricate a novel LPFG by the focused CO$_2$ laser beam carving periodic grooves on the fiber and investigate the strain characteristics of the LPFGs fabricated. The variations of transmission spectrum and polarization dependent (PDL) loss of the CO$_2$ laser-grooved LPFGs with different fabrication parameters as functions of applied tensile strain are demonstrated and evaluated.

Figure 1:
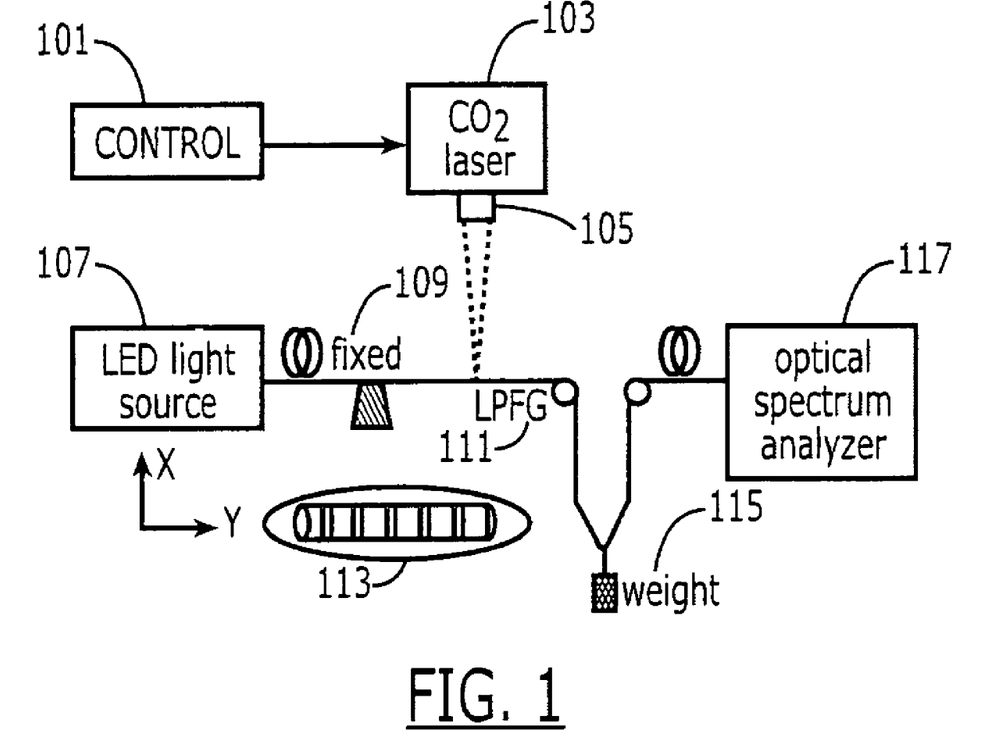
FIG. 1 shows the system for manufacturing LPFG in accordance with the present invention.

FIG. 1 is an embodiment of a system in accordance with the present invention, containing a controller 101, CO$_2$ laser 103, 2-dimensional scanner 105, LED light source 107, fixing means 109, fiber optic 111, weight 115, and spectrum analyzer 117. Operation of the system results in a grated fiber optic 113, having grates with depths of about 10 to about 20 μm, and widths of about 45 to about 55 μm. In one embodiment, the grates possess a depth of 15 μm and widths of 50 μm. The number of grates can vary depending on desired effect of the resultant fiber.

The controller 101 as used in the system can contain a storage means including ROM or RAM, a microprocessor, user interface devices such as keyboard and mouse, cable connectors, and display. Example of controller 101 include desktop computer, laptop computer, or PDA.

The CO$_2$ laser 103 can be a self-continued unit with a power connector. The laser 103 also can include a chiller unit, such as water or air chiller. The laser 103 can deliver at a wavelength of between 10 to 10.7 microns, have a power output between about 5 to 50 W, with a modulation up to 20 kHz. The laser 103 preferably delivers a hole diameter of about 30 to 40 μm, more preferable 35 microns. Examples of suitable lasers include Synrad™ models 48-1, 48-2, and 48-3.

The scanner 105 is controlled by the controller 101. The scanner is preferable 2-dimensional, and allows a scanning speed in the X-plane and Y-plane. The scanner 105 allows a scanning speed of the laser between 1-4 mm/s, preferably 2 to 2.5 mm/s.

An LED light source 107 is also included in the system, such light source 107 used in conjunction with the spectrum analyzer 117. The light source 107 allows the determination of the optical characteristics of the grated fiber 111.

A fixing means 109, such as a pin, is included in the system, such fixing means 109 being used to secure one end of the fiber 111 during operation of the laser 103.

The fiber optic 111 used during the process can be doped, such as by Germanium (Ge), or phosphorus penlaoxide (P$_2$O$_3$). The fiber optic 111 can be single mode or multimode. In a preferred embodiment, the fiber 111 is single mode, Ge-doped.

The weight 115 or load is attached to the end opposite the fixed end 109, in order to keep the fiber 111 taught during operation of the laser 103. The weight can be between 1 to 10 g, preferably 5 g.

The spectrum analyzer 117, as stated previously, is used in conjunction with the LED light source to allow determination of the optical characteristic of the fiber following operation. Examples of a suitable analyzer include HP 86142B™.

Figure 2:
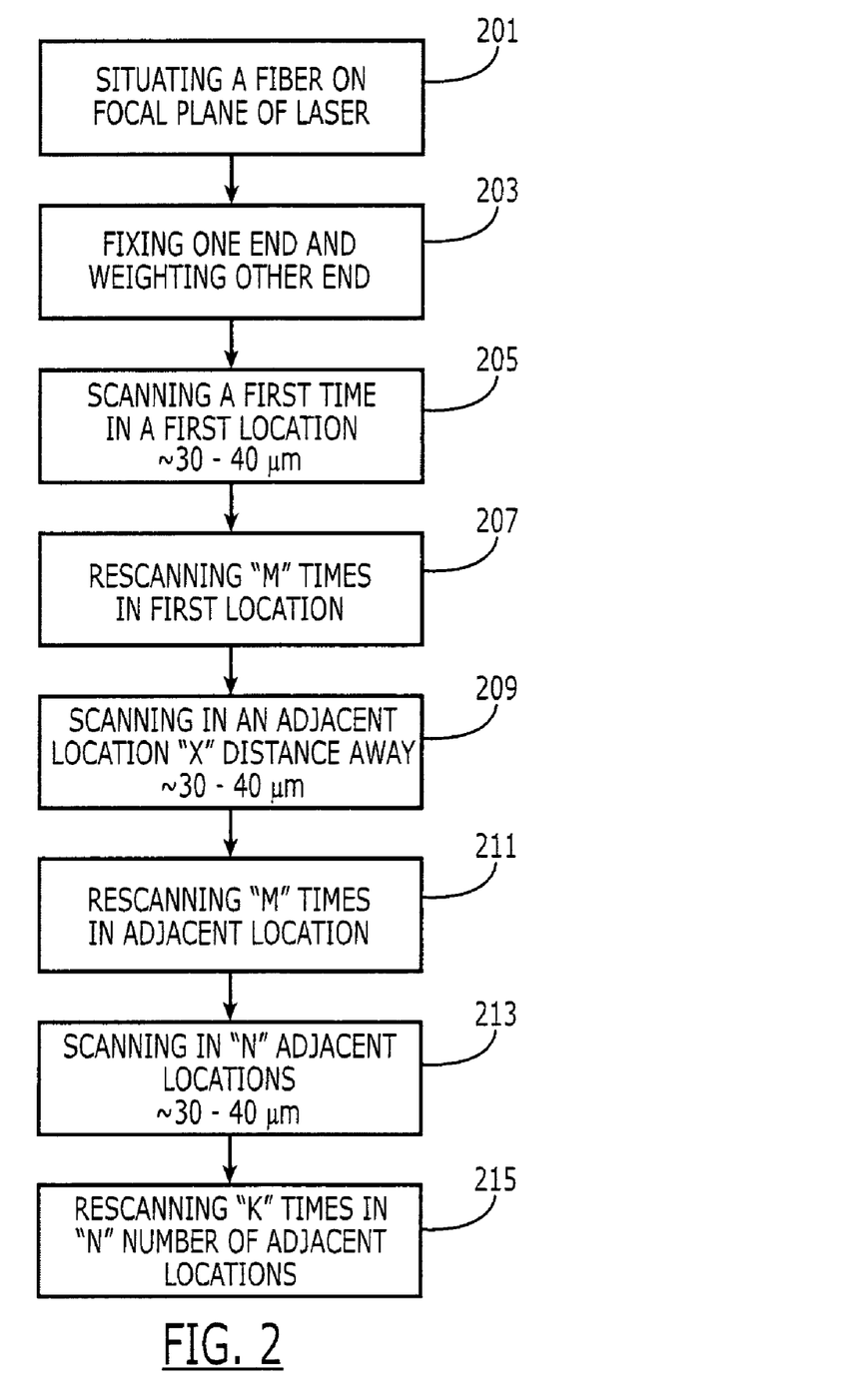
FIG. 2 shows a method of manufacturing LPFG in accordance with the present invention.

FIG. 2 is a method in accordance with the present invention, such method containing the steps of situating a fiber on a focal plane 201, fixing one end and weighting the other end 203, scanning a first time in a first location between about 30 to about 40 μm 205, rescanning "M" times in a first location 202, scanning in an adjacent location "X" distance away 209, rescanning "M" times in the adjacent location 211, scanning in "N" number of adjacent locations about 213, and rescanning "K" times in "N" number of adjacent locations 215, where M, K, and N can be from 1 to ∞.

Situating a fiber on a focal plane of the laser 201 comprises positioning a fiber optic below the $CO_2$ laser. The fiber optic, as stated previously, is preferable a single-mode, Ge-doped fiber. Following situating a fiber 201, one end of fiber is fixed and the other end of the fiber is weighted. [Find purpose of this].

To the steps of scanning a first time in a first location 205, rescanning "M" times in first location 207, scanning in an adjacent location "X" distance away between about 100 to about 500 μm 209, rescanning "M" times in the adjacent location 211, scanning in "N" adjacent locations 213, and rescanning "K" times in "N" number of adjacent locations 215, the below discussion addresses these steps in detail. Scanning with the $CO_2$ laser will deliver a hole of 30 to 40 μm in diameter.

A focused $CO_2$ laser beam scans in a first locations 205. The focused laser beam scans repeatedly for M times at the location 207, corresponding to the first grating period, of the fiber along the 'X' direction. Then the laser beam is shifted by a grating pitch along the 'Y' direction and scans repeatedly again for M times to fabricate next grating period 209. This scan and shift process are done periodically for N times 213 until the final grating period is fabricated. The above process may be repeated for K cycles from the first grating period to the final gating period until a high quality LPFG is produced 215. The repeated scanning of $CO_2$-laser beam creates a local high temperature in the fiber which leads to the gasification of $S_iO_2$ on the surface of the fiber. As a result, and as will be discussed later, periodic grooves are carved on the fiber. As stated, the method results in grates having depths at about 10 to about 20 microns, and widths of about 45 to 55 microns.

Figure 3:
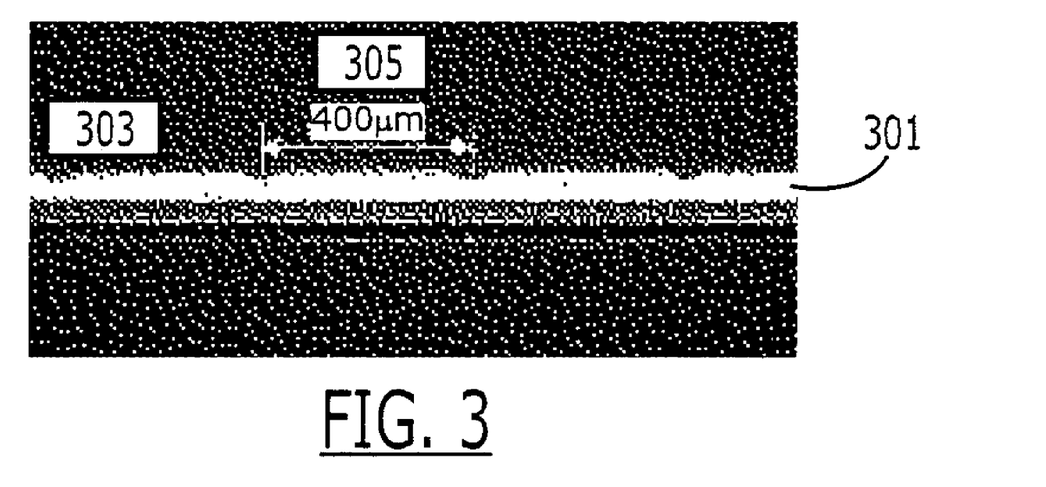
FIG. 3 is an LPFG manufactured by the system and method of the present invention.

FIG. 3 shows a fiber 301 with grooves 303 according to the instant invention. Such grooves induce a periodic refractive index modulation along the fiber axis due to the photoelastic effect, thus creating a LPFG. The groove's depth, which indicates the efficiency of $Co_2$ laser heating and the corresponding refractive index modulation, depends on many fabrication parameters, such as the diameter of the focused laser light spot, the scanning speed of laser beam, the average laser output that is determined by the repetition rate and the width of the laser pulses, the number of scanning times at each grooved region and the number of scanning cycles. Typical depth and width of grooves are between about 10 to about 20 μm and between about 45 to about 55 μm respectively, in the $CO_2$-laser-grooved LPFG. The grooves can be scanned between 100 to 500 μm apart. In one embodiment, they can be 400 microns apart. The diameter of the focused $CO_2$ laser beam spot is between about 30 to 40 μm, the average output power of the $CO_2$ laser is about 0.5 W to 1 W, the scanning speed of laser beam between 1 mm/s to 4 mm/s, about 2.326 mm/s and the pulse repetition rate is up to 20 kHz, preferable 10 kHz.

During the fabrication process, the resonant wavelength of grating shifts toward the shorter wavelength, i.e. 'blue' shift, and the absolute value of the peak transmission attenuation at the resonant wavelength increases with the increase of refractive index modulation due to the increased number of $Co_2$ laser scanning cycles. It has been observed that, after it increased to a critical value, the peak transmission attenuation of the $CO_2$-laser-grooved LPFG reduced with the increase of refractive index modulation. This is treated as the overcoupling phenomena due to the reverse coupling of the cladding mode to the fundamental core mode, which is similar to the overexposure case during the fabrication of the photo-induced LPFG.

Contributions to the refractive index modulation in the stretched $CO_2$-laser-grooved LPFGs may be regarded as from the three origins $$\Delta n(r) = \Delta n_{residual}(r) + \Delta n_{groove}(r) + \Delta n_{stretch}(r)$$

where $\Delta n_{residual}(r)$ is the initial refractive index perturbation induced by the residual stress relaxation resulting from the high local temperature, which is similar to the case of the CO2-laser-fabricated LPFGs without periodic grooves; $\Delta n_{groove}(r)$ is initial the refractive index perturbation induced by the periodic grooves on the fiber, which is similar to the case, i.e. $\Delta n_{corrugated}$, of the corrugated LPFGs fabricated by hydrofluoric acid etching; $\Delta n_{stretch}(r)$ is the refractive index perturbation induced by the external stretching force and may be further expressed as $$\Delta n_{stretch}(r) = \Delta n_{strain}(r) + \Delta n_{microbend}(r)$$

where $\Delta n_{strain}(r)$ is the refractive index perturbation induced by the difference in the stretch-induced tensile strains in the grooved and ungrooved regions, $\Delta n_{microbend}(r)$ is the refractive index perturbation induced by stretch-induced periodic microbends. When a stretching force is applied to the $CO_2$-laser-grooved LPFG, the grooved and ungrooved regions bear the same longitudinal forces. Hence the grooved and ungrooved regions will bear different tensile stesses/stains, which are inversely proportional to the cross section area of the corresponding regions. According to the photoelastic effect, the tensile-strain-induced refractive index changes of the grooved and ungrooved regions are $$\delta n_g(r) = -\frac{1}{2} p_\varepsilon [n_g^{(0)}(r)]^3 \frac{F}{\pi r_g^2 E}, \quad 0 \le r \le r_g$$

$$\delta n_u(r) = -\frac{1}{2} p_\varepsilon [n_u^{(0)}(r)]^3 \frac{F}{\pi r_u^2 E}, \quad 0 \le r \le r_u$$

where $P_e$ is the effective photoelastic constant taking into account the effect of Poisson's ratio, $n_g^{(0)}(r)$ and $n_u^{(0)}(r)$ are the initial index profiles of the grooved and ungrooved regions before the LPFG is stretched, $r_n$ is the effective radius taking into account the asymmetric grooves in the grooved region. Thus, the tensile-strain-induced refractive index perturbation, $\Delta n_{strain}$, may be given by $$\Delta n_{strain}(r) = \delta n_g(r) - \delta n_u(r)$$

$$= -\frac{1}{2} p_\varepsilon [n_g^{(0)}(r)]^3 \left[1 - \frac{r_u^2}{r_g^2}\right] \varepsilon$$

where $\varepsilon$ is the tensile strain in the ungrooved section, as defined in Eq. (1)

Material structure analyses based on the finite-element method show that small lateral bends are induced in the grooved section of fiber when the fiber with asymmetric grooves is stretched longitudinally. If the grooves are distributed uniformly along the fiber's axis, uniform bends, i.e., periodic microbends, are formed when the fiber is stretched. The amplitude of the stretch-induced bends increases with the increase of the stretching force, and the maximum bending amplitude occurs at the center of each grooved regions. The stretch-induced microbends depend strongly on the groove parameters, such as the depth of groove, the width of groove, the stretching force applied, the grating pitch, and the critical periodicity of fiber. For the setp-index fibers, the critical periodicity, $\Lambda_4$, is given by $$\Lambda_\varepsilon = \frac{\sqrt{2}\pi n_{co}}{NA}$$

where r is the core radius, $n_{co}$, is the refractive index of the core, NA is the numerical aperture of the fiber. The microbends are induced most easily in the grooved fiber with a grating pitch close to the critical periodicity. And the deeper the groove is, the larger the amplitude of the stretch-induced microbend is. When the ratio of the width of groove to the grating pitch is approximately 0.4, the stretch-induced microbend is the most sensitive to the stretching force. The bending amplitude decreases with the increased number of grooves (or grating periods) within a fixed length (L) of the stretched section. The relation between the bending amplitude, the number of grooves, and the grating pitch may be approximately given by $$\frac{A_{N_1}}{A_{N_2}} = \frac{N_2^2}{N_1^2} \approx \frac{\Lambda_1^2}{\Lambda_2^2}$$

where $\Lambda_1$ and $\Lambda_2$ are the grating pitches of LPFGs with the number of grooves of $N_1$ and $N_2$ respectively; $A_{N_1}$ and $A_{N_2}$ are the corresponding bending amplitudes. The stretch-induced periodic microbends can induced the periodic refractive index perturbation, $\Delta n_{micorbend}(r)$, via the photoelastic effect, which enhances the mode coupling in the $CO_2$-laser-grooved LPFGs.

EXAMPLES

Example 1

Figure 4:
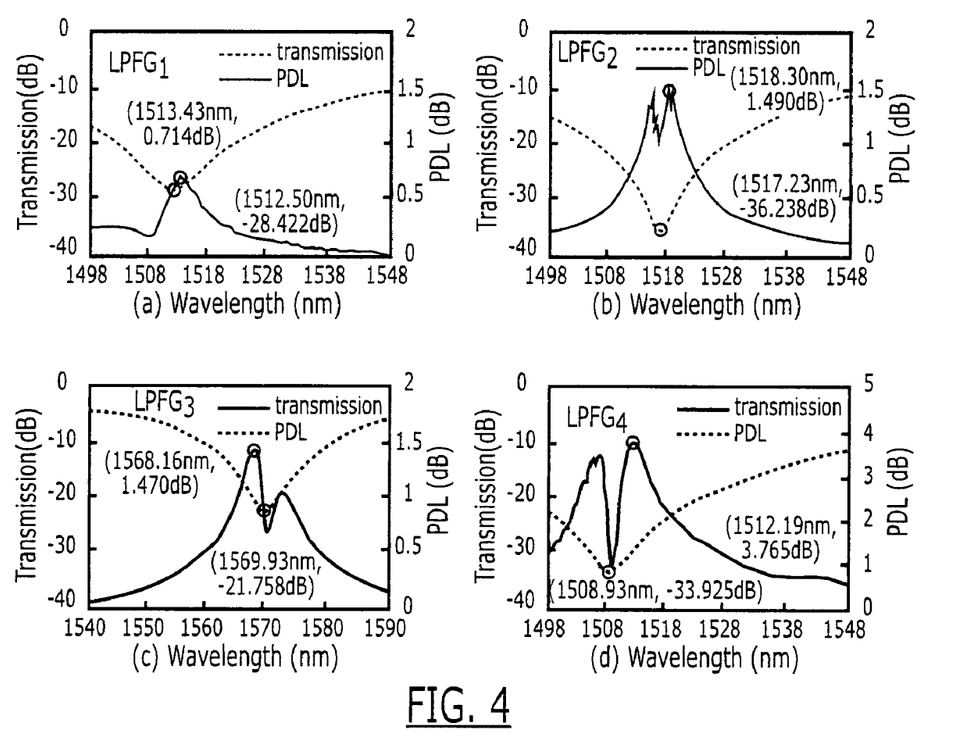
FIG. 4 illustrates the transmission spectra and PDL of four fibers fabricated via the present invention.

FIG. 4 illustrates the transmissions spectra and PDL of four fibers fabricated via the present invention using different fabrication parameters; $LPFG_1$, $LPFG_2$, $LPFG_3$, and $LPFG_4$.

The spectra were obtained with an Agilent 81910A photonic all-parameter analyzer consisting of an optical test head, an 8164B lightwave measurement system, an 81600B tunable laser source, an 81634B power sensor module, and an 8169A polarization controller. The scanning speed of laser beam and the product, M·K, of the fabrication parameters, M and K, indicate the total exposure time of the $CO_2$ laser at each grating period and consequently determines the depth of grooves in the LPFG. For the four LPFGs, i.e., $LPFG_1$, $LPFG_2$, $LPFG_3$, and $LPFG_4$, as shown in FIG. 4, the depths of the grooves, $D_1$, $D_2$, $D_3$ and $D_4$ and hence the initial refractive index modulations, $\Delta n_1^{ini}$, $\Delta n_2^{ini}$, $\Delta n_3^{ini}$, $\Delta n_4^{ini}$, satisfy the relationships $D_3 < D_1 < D_2 < D_4$ and $|\Delta n_3^{ini}| < |\Delta n_1^{ini}| < |\Delta n_2^{ini}| < |\Delta n_4^{ini}|$, respectively, where the absolute value of the refractive index is used considering the negative refractive index modulation induced by $CO_2$ laser.

According to the mode coupling theory, the magnitude of the refractive index modulation determines the transmission attenuation of LPFG. The peak transmission attenuation of $LPFG_2$ is larger than that of $LPFG_1$ because that $|\Delta n_2^{ini}| > |\Delta n_3^{ini}|$, as shown in FIGS. 4(a) and (b). The resonant wavelength of LPFG is proportional to the grating pitch, and hence the resonant wavelength of $LPFG_3$ with a larger grating pitch ($\Lambda = 420$ µm) is larger than that of $LPFG_1$ and $LPFG_2$ with a smaller grating pitch ($\Lambda = 400$ µm), as shown in FIGS. 4(a), (b), and (c). Single side incidence of $CO_2$ laser beam induces an asymmetric index profile within the cross section of the $CO_2$-laser-grooved LPFG, which is similar to the case of the $CO_2$-laser-induced LPFG without physical deformation. Consequently, as shown in FIG. 4, obvious polarization dependences exist in the $CO_2$-laser-grooved LPFGs, and the higher the refractive index modulation in the LPFG is, the larger the corresponding maximum PDL is. The overcoupling occurred during the fabrication of $LPFG_4$ (d) because of the extended exposure time. A maximum transmission attenuation of up to −45.783 dB at the resonant wavelength of $LPFG_4$ (d) was observed just before overcoupling and then the transmission attenuation was reduced to −33.925 dB, as shown in FIG. 4(d), due to the overcoupling. No overcoupling phenomena were observed during the fabrication of the $LPFG_1$ (a), $LPFG_2$ (b), and $LPFG_3$ (c).

Example 2

Figure 5:
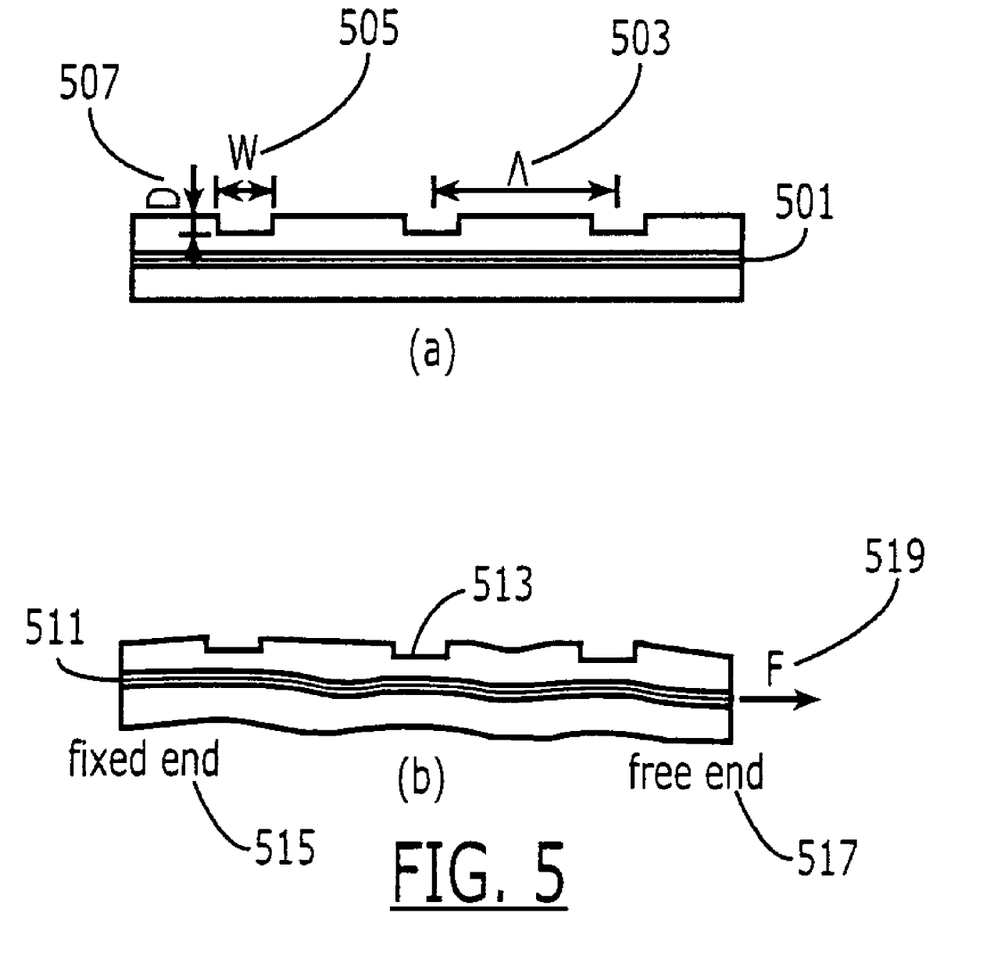
FIG. 5 shows the lay out of grooves along an LPFG manufactured by the present method.

FIG. 5 shows $CO_2$ laser grooved 501/511 manufactured in accordance with the present invention. The LPFG's 501/511 includes grooves of a particular distance apart 503, a particular width 505, and a particular depth 507. During manufacture, one end of the tested fiber with a LPFG in the middle is fixed 515 and the other end 517 is stretched by use of different weights attached. When an external stretching force F519, is applied to the free end of a single mode fiber, the induced tensile stain, $\epsilon$, of the fiber may be expressed as $$\varepsilon = \frac{\sigma}{E} = \frac{F}{AE}$$

where $\sigma$ is the tensile stress acting on the fiber; E is the elastic or Young's modulus of the single mode fiber (typically 72.5 GPa); A is the cross-sectional area of the fiber. As shown in FIG. 5(b), because of the asymmetric structure of the $CO_2$-laser-grooved LPFG 511, i.e. periodic grooves 513 on a single side of the fiber; when it is stretched longitudinally 519 via the fixed end 515 and the free end 517, small lateral bends, i.e. periodic microbends, will be induced in the grooved section of fiber. These stretch-induced microbends enhance refractive index modulation in the $Co_2$-laser-grooved LPFGs 511; consequently, the transmission spectra and polarization dependences of the $Co_2$-laser-grooved LPFGs 511 vary due to the microbend-induced refractive index modulation. We have measured the transmission spectrum and polarization dependence of LPFGs by using the Agilent 81910A photonic all-parameter analyzer under different tensile strains.

Figure 6:
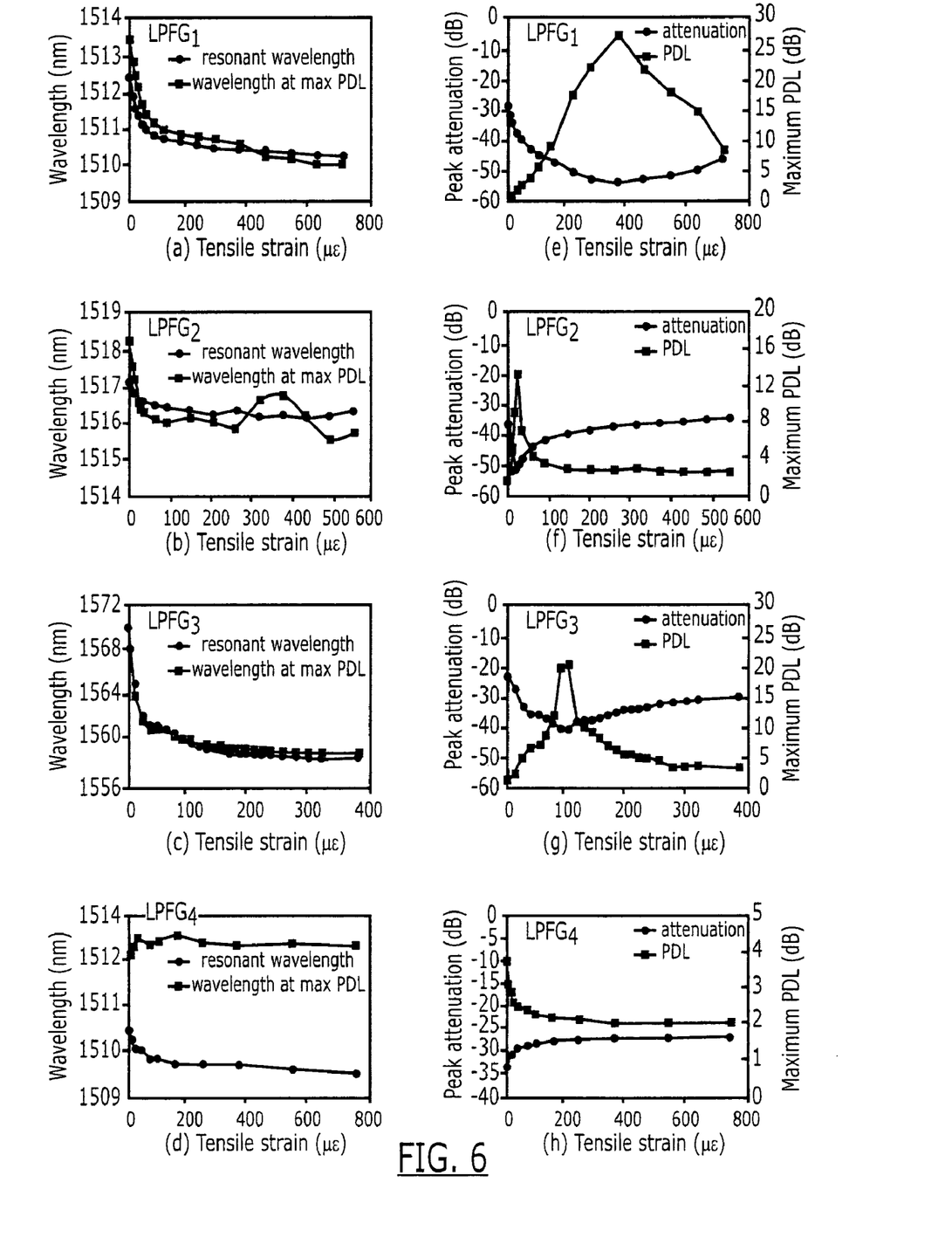
FIG. 6 graphs the change of the resonant wavelength, the past transmission, the maximum PDL, and the wavelength at maximum PDL for four LPFGs as function of tensile strain.

FIG. 6 shows the change of the resonant wavelength, the peak transmission, the maximum PDL, and the wavelength at the maximum PDL as functions of applied tensile strain for the four LPFGs ($LPFG_1$, $LPFG_2$, $LPFG_3$ and $LPFG_4$) as described in FIG. 4 shows, respectively, the evolution of the transmission spectra and the PDL of the four LPFGs with the applied tensile stain. The values of the tensile strain are calculated from the weight applied on the free end of the LPFGs via Eq.(1), and the influence of the periodic grooves on the fiber is ignored due to the much smaller dimension of the grooves as compared with the cross-section of the original fiber.

Figure 7:
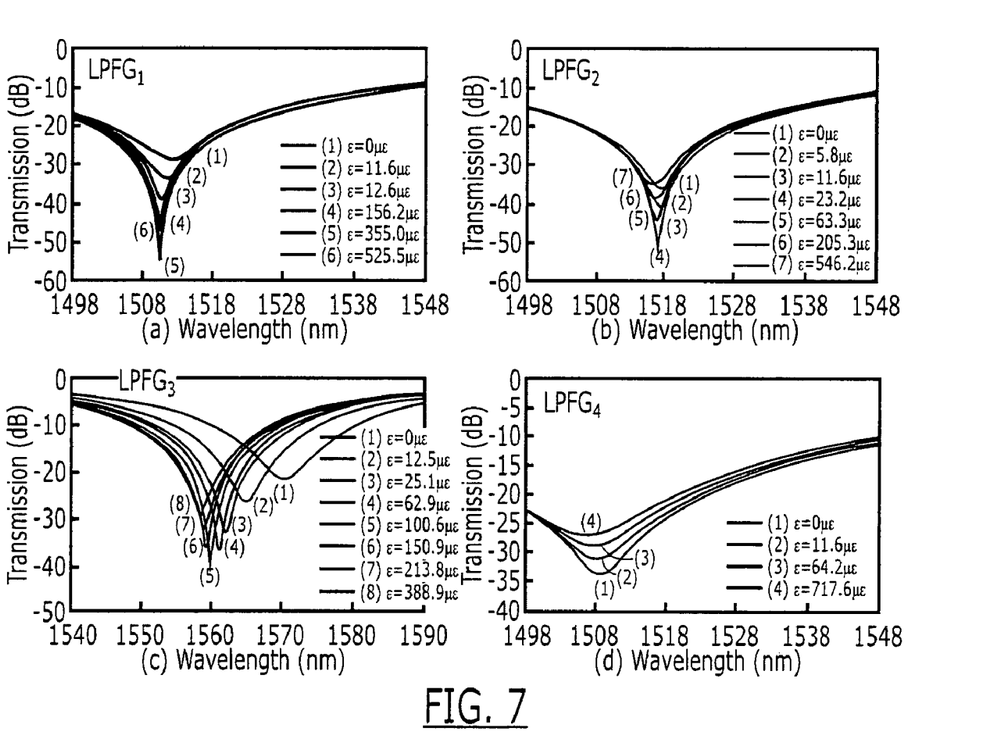
FIG. 7 graphs transmission vs. wavelength for four LPFG manufactured by present method under different tensile strain.

The resonant wavelength of a LPFG is given by $$\lambda_{max} = (n_{eff}^{co} - n_{eff}^{el})\Lambda \left(1 + \frac{\delta n_{eff}^{co} \frac{d\lambda_{rst}}{d\Lambda}}{(n_{eff}^{co} - n_{eff}^{el})^2}\right)$$

where $n_{eff}^{co}$ and $n_{eff}^{cl}$ are effective indices of the fundamental core mode and of the cladding mode, respectively; $\Lambda$ is the grating pitch; $\delta n_{eff}^{co}$ is the average index modulation over the grating; $\lambda_{res}$ is the initial resonant wavelength when $\delta n_{ef}^{fo} \rightarrow 0$. Because the refractive index modulation due to the residual stress relaxation via the photoelastic effect in the $CO_2$-laser-induced LPFG is negative, i.e. $\delta n_{eff}^{co} < 0$, the resonant wavelength of LPFG 'blue' shifts with the increase of the absolute value of $\delta n_{eff}^{co}$ due to the repeated scanning of focused $CO_2$ laser beam. This phenomenon has been observed during the LPFG fabrication process and is opposite to the transmission spectrum evolution of the UV-induced LPFGs that exhibits a positive refractive index modulation. Periodic microbends shown n FIG. 5(b) are enhanced when the stretching force is increased. This will result in an increase in the microband-induced index modulation. The tensile-strain-induced refractive index perturbation as given in Eq. (6) will also increase with the stretching force. Hence the absolute value of refractive index modulation, $|\Delta n(r)|$, as given in Eq. (2) will increase with the increase of the stretching force. Consequently, when the $CO_2$-laser-grooved LPFG is stretched, the stronger mode coupling occurs in the grating, which results that the resonant wavelength 'blue' shifts, as shown in FIGS. 6(a), (b), (c), and (d), and FIG. 7. For example, the resonant wavelength of the $LPFG_3$ shifts from 1569.93 nm to 1558.09 nm (by −11.8 nm) when the tensile stain is increased from zero to 388.90 με. Hence, the $Co_2$-laser-grooved LPFG can also be used as a highly sensitive stain sensor based on the variation of the resonant wavelength as function of applied strain.

Both the stretch-induced tuning range of resonant wavelength and the strain sensitivity depend strongly on the initial refractive index modulation of the $Co_2$-laser-grooved LPFG. That is, the smaller the initial refractive index modulation in the LPFG is, the larger the range of the stretch-induced wavelength shift is and hence the higher the corresponding strain sensitivity is. This can be seen from the evolution of the transmission spectrums of $LPFG_1$, $LPFG_2$, and $LPFG_3$. For example, as shown in FIGS. 6 and 7, before overcoupling, the resonant wavelength of $LPFG_3$ that has the smallest refractive index modulation of $\Delta n_3^{ini}$ shifts from 1569.93 nm to 1559.58 nm (by −10.35 nm) with a very high average sensitivity of −102.89 nm/mε, whereas that of $LPFG_1$ that has a larger refractive index modulation of $\Delta n_1^{ini}$ shifts from 1512.51 nm to 1510.43 nm (by only −2.08 nm) with an average sensitivity of −5.86 nm/mε.

It was observed previously that the stain sensitivity of resonant wavelength of the $Co_2$-laser-induced LPFGs without periodic grooves in the standard Ge-doped telecom single mode fiber (Corning SMF-28) and in the pure silica core fiber with a fluorine-doped silica cladding were −0.45 nm/mε and 0.1 nm/N (~0.09 nm/mε), respectively. It is obvious that the average stain sensitivity of resonant wavelength of the LPFG written in the same fiber (Corning SMF-28) is increased by 229 times by means of carving periodic grooves in the LPFG. Hence, the $CO_2$-laser-grooved LPFG can be used as a highly sensitive stain sensor by detecting the shift in the resonant wavelength. Alternatively, the $CO_2$-laser-induced LPFG may also be used as a tunable optical filter with a large wavelength tuning range. It is also observed that, when a stretching force is applied, the resonant wavelength 'blue' shifts in our work, whereas it shifts toward the opposite direction in the opposite directions of stain-induced wavelength shifts may be attributed to the different types of fibers used. The standard Ge-doped telecom single mode fiber can be used as well as pure silica core fiber with a fluorine-doped silica cladding. It has been demonstrated that the sensitivity and direction of the strain-induced wavelength shift to LPFG depend strongly on the optical fiber parameters, e.g. the photoelastics constants in the core and cladding.

The grooves in the $CO_2$-laser-grooved LPFG are asymmetric and the analysis of such a asymmetric structure would be difficult. However, we may use the results for symmetric grooved structures that were developed for the corrugated LPFG to approximately explain the transmission characteristics of the asymmetricly grooved LPFG. The transmission attenuation, T, of the corrugated LPFG may be expressed as $$T \equiv \cos^2(\bar{k}L) = \cos^2\left[\alpha\varepsilon L\left(\frac{r_u^2}{r_g^2} - 1\right) + \phi\right]$$

where $\bar{k}$ is the averaged coupling coefficient between the core mode and the cladding mode, L is the length of the $CO_2$-laser-grooved LPFG, $\alpha$ is the empricial coefficient representing the overall dependence on the overlapping integrals and the photoelastic constants, $r_u$ is the radius in the ungrooved region, $r_g$ is the effective radius taking into account the asymmetric grooves in the grooved region, and $\Phi$ is a constant that is determined by the initial LPFG parameters before the strain is applied. As shown in FIGS. 6 and 7, the absolute values of transmission attenuations increase rapidly due to the stronger mode coupling when the external stretching force is applied to the $CO_2$-laser-grooved LPFGs. And the transmission attenuation changes to the opposite direction when the tensile strain is increased beyond a critical value at which overcoupling between the fundamental core mode and the cladding mode occurs. For example, the peak transmission attenuation at the resonant wavelength of $LPFG_1$ changed from −28.422 dB to −54.335 dB (by 25.913 dB) when the tensile stain was increased from zero to 355.08 με. The variations of the strain-induced transmission attenuation shown in FIGS. 6 and 7 agree with the cosine square dependence as indicated in Eq. (10). It can be seen from Eq. (10) that, as the different between $r_g$ and $r_u$ increases, the sensitivity of the transmission attenuation to the tensile strain increases. That is, the deeper the grooves in the LPFG are, the larger the attenuation sensitivity of LPFG to the strain is. This phenomenon has been observed during our experiments. As shown in FIGS. 6(e) and (f), before overcoupling, the attenuation sensitivity of $LPFG_2$ that has deeper grooves to the stain is higher than that of $LPFG_1$ that has shallower grooves. In addition, it can be seen from FIG. 6(h) and FIG. 7(d), the absolute value of the transmission attenuation of $LPFG_4$ reduces with the applied tensile stain. The reason for this is that, during the fabrication of the $LPFG_4$, the overcoupling has occurred due to the strong refractive index modulation induced by the $CO_2$ laser heating, and the applied strain further enhance the overdoupling. Hence the $CO_2$-laser-grooved LPFG can also be used a highly sensitive stain sensor based on the intensity variation at the resonant wavelength.

Figure 8:
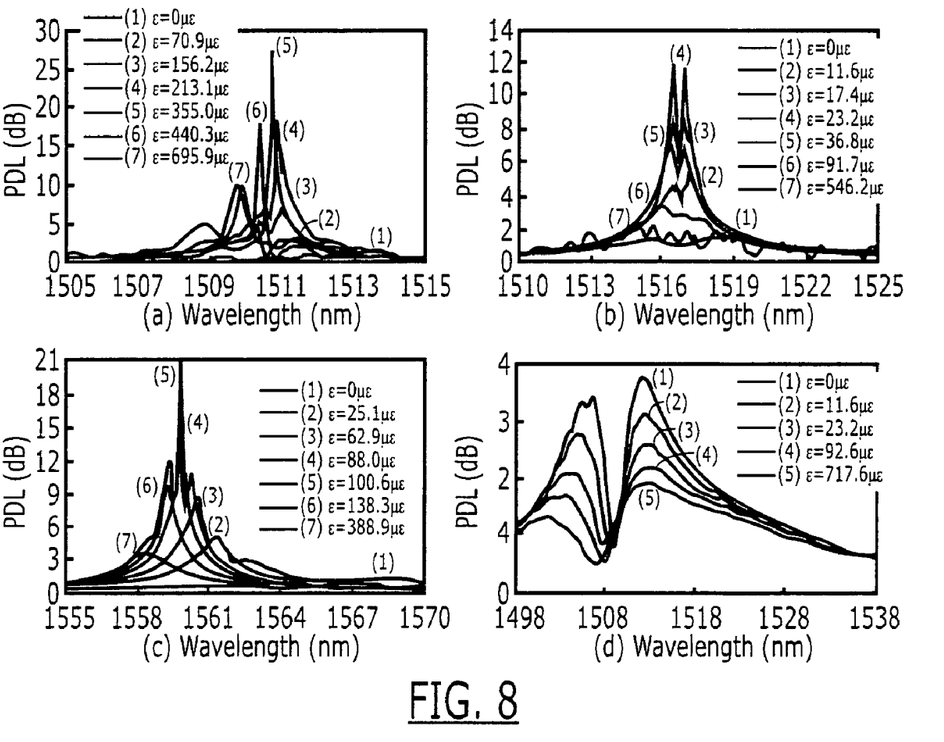
FIG. 8 graphs PDL vs. wavelength for four LPFGs under different tensile strain.

As shown in FIG. 8, the maximum PDLs of 0.714 dB, 1.490 dB, and 1.470 dB in $LPFG_1$, $LPFG_2$, and $LPFG_3$, respectively, are similar to that of 1.2 dB in the $CO_2$-lasergrooved LPFGs without periodic grooves, which indicates that periodic grooves do not enhance obviously the polarization dependence in the LPFG. The reason for this is that, although periodic grooves increase refractive index modulation from Eqs.(2) and (3), the grooves confined in the outer cladding does not influence obviously the asymmetry of index profile within the cross section of the core and inner cladding of the $CO_2$-laser-induced LPFG under the strain free state ($\epsilon$=0). However, when the $CO_2$-laser-grooved LPFG is stretched, the asymmetric tensile strain produced within the cross section of the grooved region due to the asymmetric groove structure induces asymmetric refractive index perturbation, which enhances the asymmetry of index profile within the cross section of the LPFG. As a result, the polarization dependences (or the maximum PDL) of $LPFG_1$, $LPFG_2$, and $LPFG_3$ increase with the increase of the tensile strain applied, and it changes to the opposite direction after the overcoupling occurs (see FIGS. 6(e), 6(f), 6(g), and FIG. 8). For example, the maximum PDL of $LPFG_1$ changes from 0.657 dB to 27.192 dB (by 26.535 dB) when the tensile strain increases from zero to 355.08 $\mu\epsilon$. This indicates that the $CO_2$-laser-grooved LPFG may be used as a promising polarizing device. The intensity variation of the light source does not influence the PDL of LPFG. And hence the $CO_2$-laser-grooved LPFG may also be used as highly sensitive strain sensor based on the PDL with immunity from the intensity variation of the light source.

It is can be seen from FIG. 6(h) and FIG. 8(d) that the polarization dependence of $LPFG_4$ decreases monotonously with the increase of the applied tensile strain. This is due to the same mechanism as that of the transmission attenuation evolution under the condition of overcoupling. In fact, as can be seen from FIGS. 6, 7 and 8, the trends of polarization dependence evolution are similar to that of the transmission spectrum. And the wavelengths at the maximum PDL are always close to the resonant wavelengths of LPFGs.

As explained above, before overcoupling, the stretch-induced refractive index perturbations in the $CO_2$-laser-grooved LPFG result in resonant wavelengths 'blue' shifting and the absolute value of transmission attenuation increases. This is similar to the transmission spectrum evolution during the LPFG fabrication and hence may be regarded as a continuation of the LPFG fabrication process.

The $CO_2$-laser-grooved LPFGs combine the features of the $CO_2$-laser-induced LPFG without physical deformation, the corrugated LPFGs fabricated by hydrofluoric acid etching, and the microbend-induced LPFG. The mechanisms of refractive index modulation in such LPFGs under the stretching force may be regarded to consist of the stress-relaxation-, the groove-, the strain-, and the microbend-induced refractive index perturbations. Transmission spectrum and polarization dependence of the $CO_2$-laser-grooved LPFG depend strongly on the tensile strain applied. The resonant wavelength of the LPFG 'blue' shifts with the increase of the tensile strain, and the wavelength at the maximum PDL always is near the resonant wavelength of the LPFG. The stretch-induced evolution of transmission spectrum and polarization dependence in the $CO_2$-laser-induced LPFG can be divided into two opposite stages: before and after overcoupling. Before overcoupling, the absolute value of transmission attenuation and the PDL increase with the increase of the tensile strain applied and then decreased after overcoupling. The strain-sensitivities of resonant wavelength, transmission attenuation, and PDL are dependent on the depth of grooves and/or the initial refractive index modulation in the LPFG. The average strain sensitivity of resonant wavelength of the $CO_2$-laser-induced LPFG in the Corning SMF-28 can be increased by 229 times to −102.89 nm/m$\epsilon$ by carving periodic grooves in the LPFG. When a stretching force is applied to a $CO_2$-laser-induced LPFG, the resonant wavelength can 'blue' shift by −11.84 nm, the absolute value of peak transmission attenuation and the maximum PDL can be increased by 25.913 dB and 26.535 dB, respectively. So the novel $CO_2$-laser-grooved LPFGs may be used as highly sensitive strain sensors based on the detection of resonant wavelength, transmission attenuation and the maximum PDL. They may also be designed to function as novel optical devices such as fiber polarizing devices and tunable optical filters.

Having described embodiments of the present system with reference to the accompanying drawings, it is to be understood that the present system is not limited to the precise embodiments, and that various changes and modifications may be effected therein by one having ordinary skill in the art without departing from the scope or spirit as defined in the appended claims.

In interpreting the appended claims, it should be understood that:

a) the word "comprising" does not exclude the presence of other elements or acts than those listed in the given claim;

b) the word "a" or "an" preceding an element does not exclude the presence of a plurality of such elements;

c) any reference signs in the claims do not limit their scope;

d) any of the disclosed devices or portions thereof may be combined together or separated into further portions unless specifically stated otherwise; and e) no specific sequence of acts or steps is intended to be required unless specifically indicated.

The invention claimed is:

1. A method of manufacturing a $CO_2$ laser grooved long period fiber grating, the method comprising:
   situating a fiber on a focal plane;
   fixing one end of said fiber and weighting the other end;
   scanning for a first time in a first location;
   rescanning in said first location;
   scanning in an adjacent location to said first location;
   rescanning in said adjacent location;
   scanning in N number of additional adjacent locations; and
   rescanning in said N number of additional locations;
   wherein scanning and rescanning is performed by a laser beam with a diameter of 30 to 40 µm using a $CO_2$ laser to create a local high temperature in the fiber which leads to deforming of the fiber and to gasification of $SiO_2$ on the surface of the fiber to form grooved grates having groove depths at about 10 to 20 µm and widths of about 45 to 55 µm.

2. The method of claim 1, wherein weighting said end occurs with load between about 1 g to about 10 g.

3. The method of claim 1, wherein said fiber is a single-mode fiber.

4. The method of claim 1, wherein said $CO_2$ laser has a power output between about 5 to 50 W, and a wavelength between 10 to 10.7 microns.

5. The method of claim 1, wherein scanning and rescanning occurs in the X-plane and Y-plane.

6. The method of claim 1, wherein scanning and rescanning occurs at scanning speeds between 1-3 mm/s.

7. The method of claim 1, wherein scanning in said adjacent location occurs in a location between 100 and 500 µm away from said first location.

8. The method of claim 1, further comprising increasing the groove depth of the grooved grates.

9. The method of claim 8, wherein the grooved grates has an attenuation sensitivity that increases as the groove depth increases.

* * * * *